Feb. 1, 1966   E. A. GODBY   3,233,245
FOLDED TRACE FOR RECORDERS
Filed Oct. 14, 1963

3 Sheets-Sheet 1

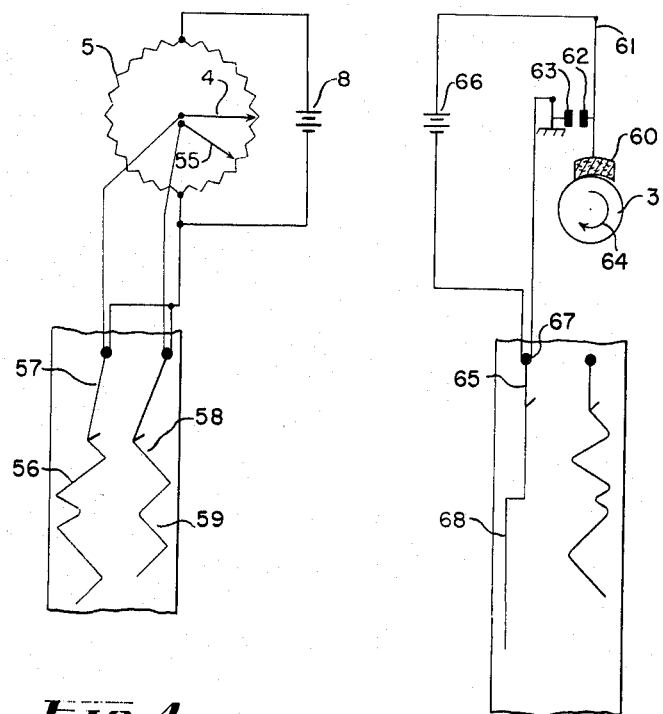
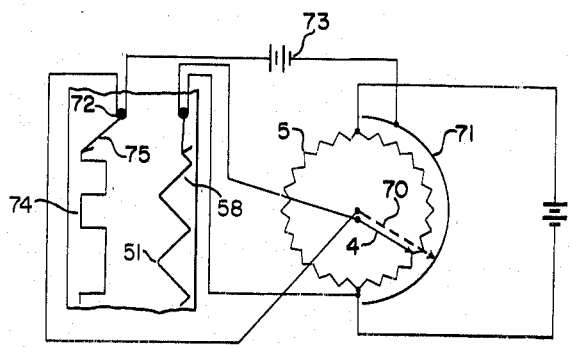

3,233,245
FOLDED TRACE FOR RECORDERS
Ensley A. Godby, 1031 Cromwell Drive,
Ottawa 8, Ontario, Canada
Filed Oct. 14, 1963, Ser. No. 316,032
5 Claims. (Cl. 346—31)

This invention relates to an apparatus for continuously recording the value of a variable and has particular reference to an apparatus which is not able to record amplitude changes of the full range of those of the variable to be measured.

It is generally economical to construct devices for recording data of small dynamic range. Nevertheless, data of large dynamic range is often encountered and it is desirable if possible, that this should be recorded on the smaller range more prevalent apparatus. In the past one method of achieving this, for instance in pen or stylus recorders, has been to use a bias stepping system. In such apparatus, a sensing device, for instance a switch, is located at either side of the recorder. When the pen reaches the limit of its travel in either direction, the corresponding switch is actuated which in turn operates a stepping mechanism to apply a bias to the recorder input in the correct direction to bring the recorder stylus back onto scale by the desired amount. This system has its disadvantages in that data may be lost during the stepping time and rather complex stepping and biassing mechanisms are required. Also, switches must be added to the recording device and this is difficult or impractical in many types of recorders. It is thus limited to recorders of the servo type where sufficient stylus driving power is available to actuate the limit switches. In sensitive galvanometer recorders, the pressure required to operate the switch is not produced.

It is an object of the present invention to overcome the inconvenience and difficulties of the prior art and to provide an apparatus in which large dynamic range data can be accommodated.

In following the teaching of the present invention, more specifically there is provided a recorder in which a large dynamic range signal trace is folded so as to be incorporated within smaller range limits.

Figure 1:
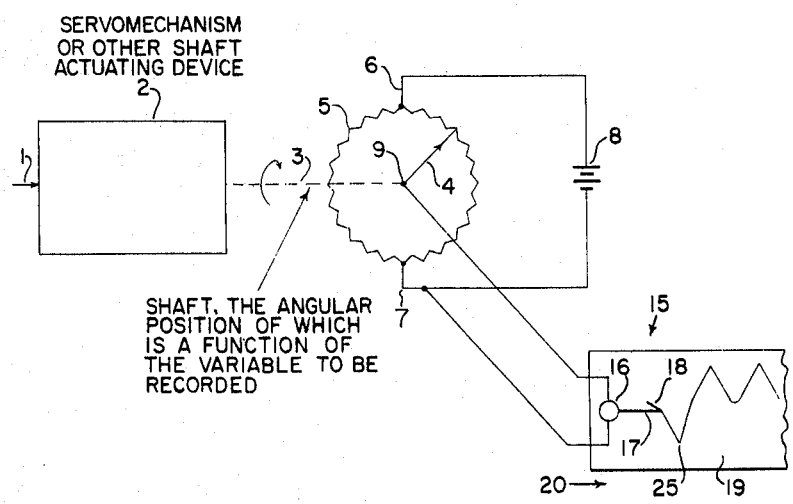
Figure 2:
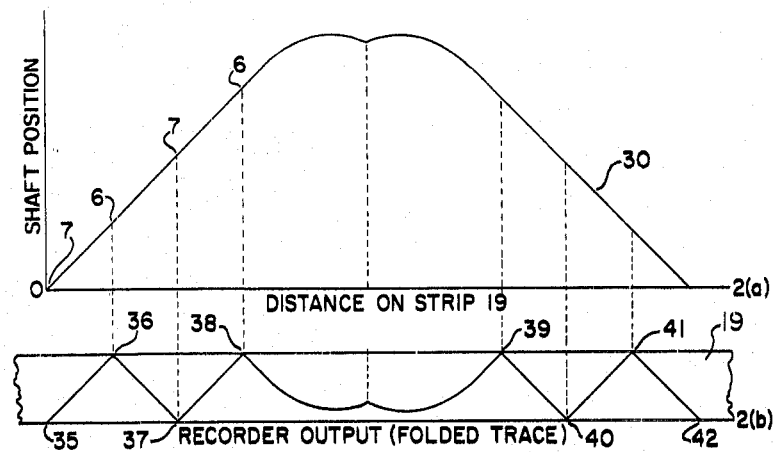
Figure 3:
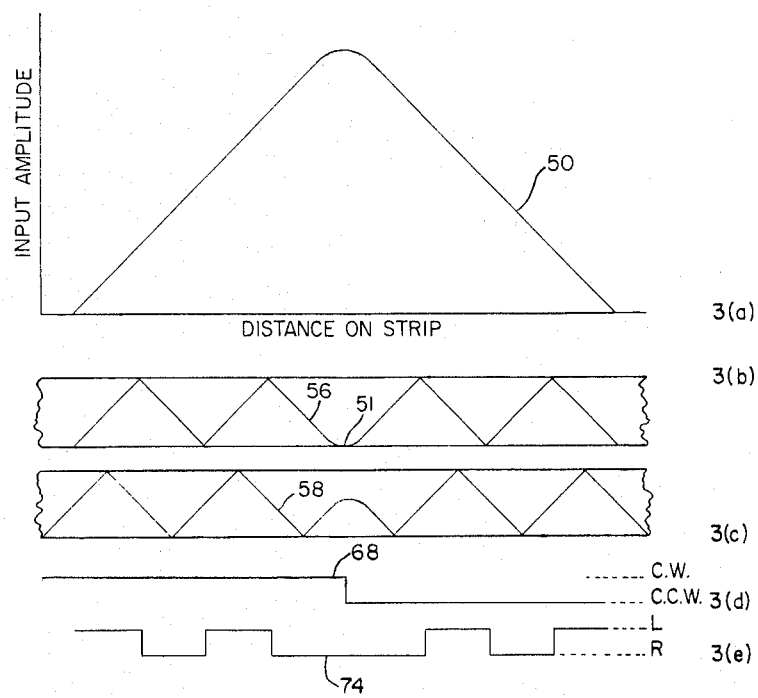

A description of several embodiments of the invention will now be made with reference to the accompanying drawings in which:

FIGURE 1 shows a schematic diagram of a circuit for use in practising the invention, FIGURE 2a shows a curve indicating the position of the shaft in FIGURE 1 against distance along a full dynamic range recording strip, and FIGURE 2b shows this curve when folded in accordance with the teaching of the invention, FIGURE 3a shows a further sample curve and FIGURE 3b, the folded curve, FIGURES 3c, 3d, and 3e show, respectively, three curves produced by modifications to the circuit of FIGURE 1 for resolving ambiguity in the curve, FIGURES 4, 5 and 6 show schematically three circuits for generating the curves of FIGURES 3c, 3d and 3e respectively.

Consider now FIGURES 1 and 2 of the drawings. In FIGURE 1, let us assume that the variable 1 to be recorded is fed into the servo mechanism 2 where a shaft output 3 is produced, the angular position of which is a function of the variable 1. No details of the servo mechanism 2 are given since this would be conventional in design, and may be omitted where the variable is already available as the angular position of a shaft. The shaft 3 determines the position of a wiper 4 directly mounted on it, the wiper travels in a circular path along a potentiometer 5 whose resistance is distributed uniformly along the circumference of a circle. At two diametrically opposed points, 6 and 7, the potentiometer is fed from a battery, or constant voltage supply, 8. Between point 9 of the slider and point 7 or 6 a recording apparatus 15 is connected. This recorder is conventional and of small dynamic range and comprises, for example, a galvanometer 16 with a pen stylus control arm 17 carrying a stylus 18. The stylus bears on a moving strip 19 travelling in the direction of arrow 20. The recorded trace can be seen at 25 on the strip 19. Instead of a stylus the galvanometer could carry a mirror upon which a beam of light impinges and is reflected onto a photographic film, in conventional manner.

Let us now assume that a variable whose function is to be recorded is fed in at 1, passes to the servo mechanism 2, and is converted to a time dependent movement of shaft 3 represented by the curve 30 of FIGURE 2a. In this curve, the ordinate axis represents shaft angular position, starting from an arbitrary zero and the abscissa represents distance along the strip 19 (related to the time elapsed). This curve is seen to be of considerable height and we will assume that its amplitude represents several rotations of the shaft 3. Its dynamic range is thus greater than can be accommodated by the pen 18 and strip 19, which we will assume reaches its limits when the slider 4 is touching the potentiometer at points 6 and 7 respectively. In employing the circuit of FIGURE 1, however, it will be noticed that if the point 35 represents the position of the slider 4 at point 7, then as the shaft rotates in a clockwise direction, point 36 represents that at which the slider arrives at point 6; 37 shows the position of slider 4 when it reaches 7 again; and 38 is the position once more at point 6. As the curve passes over its peak, slider 4 approaches but does not quite reach point 7 again. This peak portion is, therefore, shown over the range between 38 and 39 in FIGURE 2b. As the curve decrease in amplitude (by counterclockwise motion of the shaft 3), it is folded at points 39, 40, 41 and arrives at the zero position at point 42.

Some problems may arise using this system. If the peak of the curve coincides with a place at which the trace would normally be folded back on itself, or if it is not certain whether the curve is increasing or decreasing at any particular stage on strip 19. The curve 50 of FIGURE 3a represents such a situation. If folded in the manner described for FIGURE 2, the trace would be as shown for 58 in FIGURE 3b. It can be seen that at the region of 51, some confusion aggravated by the sharpness of the peak, could exist as to whether the amplitude of the input signal had continued to increase or whether it had reversed.

One circuit for overcoming this ambiguity is shown in FIGURE 4 where an additional slider 55 has been added to the potentiometer 5 and is set so that is it a predetermined angle ahead of the position of slider 4 (the axes of rotation of the sliders would be aligned but have been shown offset for greater clarity). In this instance, the waveform 56 (see also FIGURE 3c) produced by pen 57 driven from slider 4 will be a predetermined shaft angle, and therefore transverse distance across strip 59, behind the waveform 58 on strip 59 and its turning points will always be that distance spaced from those of waveform 58. It is not now possible for the crest or trough of the input signal to coincide with the turning points of both waveforms 58 and 56. One can now tell whether the waveform 58 is increasing or decreasing by noting, when a peak or trough on 58 occurs, whether 56 appears to be lagging or leading it, assuming the angular direction in which 55 is spaced from slider 4 is known.

A second method of overcoming the ambiguity is shown in FIGURE 5 where the shaft 3 has bearing against it a fibre pad 60 carried on the end of a flexible conducting strip 61 in turn carrying a contact member 62. This contact is swung into connection with a second contact 63, which is fixed, when shaft 3 rotates in the opposite direction to that shown by arrow 64. It can be seen that when the direction of rotation of the shaft reverses, the pen 65 connected between contact 63 and strip 61 through a power source 66 driving a galvanometer movement 67 shows a resulting trace 68 (see also FIGURE 3d) with a step at the point at which the rotation of the shaft has reversed. The direction of the step indicates whether the shaft has altered from clockwise to counterclockwise or vice versa.

A further way in which the ambiguity may be resolved is shown in the circuit of FIGURE 6. Here the slider 4 is arranged to rotate in synchronism with a slider 70 which contacts a slip ring 71 extending around half the circumference of the circle of potentiometer 5. The slider is connected to a galvanometer drive movement 72 and thence to a power source 73 and to slip ring 71. In this instance, it is seen that the curve 74 drawn by the pen 75 associated with the slider 70 is a step waveform in which the direction of the step at once determines whether slider 4 is on the left half or the right half of the circle of potentiometer 5 as shown in FIGURE 6. This curve 74 is also shown in FIGURE 3e. Thus, 51 on curve 58 must represent a peak because the slider 70 has remained on the same side of potentiometer 4 during the alteration.

It will be clear that although the slip ring 71 has been shown superimposed over one half of potentiometer 5, this is not essential provided that the angle by which slip ring 71 is rotated about the axis of potentiometer 5 is the same as the angle by which slider 70 is offset from the position of slider 4.

It should be noticed also that although the tapping points 6 and 7 have been shown diametrically opposed on potentiometer 5, in some applications it might be satisfactory to have them less than a diameter apart. This would alter the representation of the function on the folded trace of which account would have to be taken when reading it. The trace would be linear over each segment into which the potentiometer was divided, but there would be a greater change in trace amplitude for a given rotation of the slider over the short segment than over the longer. The device for avoiding ambiguity of FIGURE 6 would then have a slip ring extending only around as much of the circumference of potentiometer 5 as the separation of points 6 and 7.

I claim:

1. Apparatus for measuring a function defined by the angular position of a shaft, said angular position including more than a complete rotation of the shaft and for recording said function within a range whose amplitude is limited to one revolution of the shaft which comprises, a circular potentiometer, a slider for said potentiometer, means mounting said slider for rotation over said potentiometer with rotation of said shaft, means tapping said potentiometer at two separated points, means for connecting an electric potential supply between said two tapping points, a potential difference between said slider and one of said tapping points being developed in accordance with the position of said slider, potential difference recording means, said recording means comprising a record medium, marker means for said medium, means for operatively displacing said marker means over said record medium in dependence upon potential applied to the displacing means, means connecting said slider, said potentiometer, and said displacing means for recording said potential difference, said potential difference varying cyclically as said shaft performs continuous rotation in one direction, said marker thereby being displaced cyclically over said record medium in accordance with said potential difference and angular position of said shaft, and ambiguity resolving means for indicating turning points of said function recorded on said record medium by said marker means, said resolving means comprising, second marker means, second means for operatively displacing said second marker means, shaft rotation detector means coupled to said shaft, and means connecting said second displacing means and said detector means for indicating direction of rotation of said shaft.

2. Apparatus as defined in claim 1 wherein said potentiometer is linearly wound and said tapping points are diametrically opposed on said potentiometer.

3. Apparatus as defined in claim 1, said detector means comprising a second slider carried on said shaft and contacting said potentiometer, said second slider being offset about said shaft axis from said first slider, said second marker means being displaced in accordance with the potential difference between said second slider and one of said tapping points.

4. Apparatus as defined in claim 1, said detector means comprising a first fixed contact and a second contact, said second contact being mounted for swinging movement into electrical connection with said first contact upon rotation of said shaft in one direction and out of contact with said first contact upon rotation of said shaft in the other direction, said second marker means indicating electrical continuity between said first and second contacts, and consequent direction of rotation of said shaft at said turning point.

5. Apparatus as defined in claim 1, said detector means comprising a slip ring, a second slider mounted on said shaft, said second slider making electrical contact with said slip ring over that part of the rotation of said shaft when said first mentioned slider is passing between said tapping points on one side of said potentiometer, said second marker means indicating electrical continuity between said second slider and said slip ring, and consequent position of said first slider at said turning point.

References Cited by the Examiner

UNITED STATES PATENTS

| | | | |
|---|---|---|---|
| 723,725 | 3/1903 | Patton | 73—308 |
| 1,516,094 | 11/1924 | Hackman | 73—312 |
| 1,964,632 | 6/1934 | Hays | 73—312 |
| 2,004,421 | 6/1935 | Smulski | 340—177 |
| 2,298,893 | 10/1942 | Macintyre | 73—313 |
| 2,423,603 | 7/1947 | McCandless | 338—33 |
| 2,641,129 | 6/1953 | Truckenbrodt | 73—312 |
| 2,656,498 | 10/1953 | Goodwin | 346—32 |
| 2,836,064 | 5/1958 | York | 318—25 |
| 2,849,272 | 8/1958 | Brossman | 346—31 |
| 2,864,042 | 12/1958 | MacNeille | 318—25 |
| 2,902,683 | 9/1959 | Wheeler | 340—244 |
| 2,923,156 | 2/1960 | Young | 73—313 |

LEO SMILOW, *Primary Examiner.*

LEYLAND M. MARTIN, *Examiner.*

N. J. AQUILINO, *Assistant Examiner.*